United States Patent
Zhou (10) Patent No.: US 8,571,531 B2
(45) Date of Patent: Oct. 29, 2013

(54) METHOD AND APPARATUS FOR IMPLEMENTING THE CNAP SERVICE

(75) Inventor: Wen Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1362 days.

(21) Appl. No.: 12/271,062

(22) Filed: Nov. 14, 2008

(65) Prior Publication Data

US 2009/0129578 A1 May 21, 2009

(30) Foreign Application Priority Data

Nov. 16, 2007 (CN) .......................... 2007 1 0188311

(51) Int. Cl.
*H04M 3/42* (2006.01)

(52) U.S. Cl.
USPC ........ 455/415; 455/466; 455/404.2; 455/433; 455/461; 455/456.3

(58) Field of Classification Search
None
See application file for complete search history.

(56) References Cited

U.S. PATENT DOCUMENTS

| 5,604,797 A * | 2/1997 | Adcock ..................... 379/376.02 |
| 5,883,943 A | 3/1999 | Siddiqui |
| 2006/0114885 A1* | 6/2006 | Baek et al. .................... 370/352 |
| 2007/0047523 A1 | 3/2007 | Jiang |
| 2007/0211873 A1* | 9/2007 | Wang ....................... 379/142.01 |

FOREIGN PATENT DOCUMENTS

| CN | 1543176 A | 11/2004 |
| CN | 1549560 A | 11/2004 |
| CN | 1798023 A | 7/2006 |
| CN | 1798203 A | 7/2006 |
| CN | 1798207 A | 7/2006 |
| CN | 1980289 A | 6/2007 |
| CN | 101437089 B | 1/2013 |
| KR | 2006-0020115 A | 3/2006 |
| WO | WO 02/091717 A1 | 11/2002 |

OTHER PUBLICATIONS

1st Office Action in corresponding European Application No. 08169098.4 (Apr. 24, 2011).
1st Office Action in corresponding Chinese Application No. 200710188311.5 (Jan. 13, 2011).

(Continued)

*Primary Examiner* — Charles Appiah
*Assistant Examiner* — Randy Peaches
(74) *Attorney, Agent, or Firm* — Leydig, Voit & Mayer, Ltd.

(57) ABSTRACT

The present invention discloses a method for realizing the CNAP service, including: receiving a service request sent by the switching system, where the service request carries the identifier of the calling party and the identifier of the called party; querying the calling information set by the calling party according to the identifier of the calling party, and querying the location information of the called party according to the identifier of the called party; after determining that the called MS already rings, sending a flash message that contains the calling information to the called MS according to the location information of the called party. The present invention also provides a calling information service apparatus accordingly. The invention correlates the judging of the status of the call connection process with the time of implementing the CNAP service. Therefore, the calling information can be sent to the called MS at a proper time, thus helping the called party to identify the calling party correctly.

22 Claims, 6 Drawing Sheets

(56) References Cited

OTHER PUBLICATIONS

Written Opinion of the International Searching Authority in corresponding PCT Application No. PCT/CN2008/070896 (Aug. 28, 2008).

Mavrelos et al., "Calling Party Name Identity and Location (A-Side Feature)," *Siemens AG* (Oct. 2004).
Intellectual Property Office of the People'S Republic of China, $2^{nd}$ Office Action in Chinese Application No. 200710188311.5 (Apr. 12, 2012).

* cited by examiner

FIG. 11 ary to ensure that the calling information to be sent to the called MS at a proper time, and cannot help the called party to identify the calling party in some cases. For example, if the calling information is sent to the called MS before the called MS rings, while the called party is answering another call at the moment or another incoming call is received, misunderstanding may be caused to the called party; or, if the calling information is sent to the called MS after the conversation between the calling party and the called party already begins or finishes, the CNAP service is then insignificant with respect to helping the called party to know the calling information beforehand.

METHOD AND APPARATUS FOR IMPLEMENTING THE CNAP SERVICE

CROSS-REFERENCE TO RELATED APPLICATIONS

This application claims priority to Chinese Patent Application No. 200710188311.5, filed Nov. 16, 2007, which is hereby incorporated by reference in its entirety.

FIELD OF THE INVENTION

The present invention relates to communication technologies, and in particular, to a method for implementing the calling name presentation (CNAP) service and a corresponding calling information service apparatus.

BACKGROUND OF THE INVENTION

The CNAP service, also known as calling information service, is a value-added service. The application of the CNAP service is as follows: When a user originates a call as a calling party, the service system sends the calling information set by the calling party, for example, a business card and greetings, to a mobile station (MS) of a called party by means of a flash message, so that the called party can obtain the calling information visually. The user can customize the calling information by scenarios, for example, the user can send different calling information to different called parties in different time segments and in different areas, by setting individualized filter rules. Flash messages are a type of short messages. Unlike a traditional short message, which is displayed only after a user presses some keys, a flash message is displayed directly on the screen of a called MS when the flash message is received, and the flash message is generally not saved after the flash message is displayed.

The CNAP service is different from the calling line identification presentation (CLIP) service. In the CLIP service, the switching system sends the calling number to the called MS, and the called MS displays the calling number directly or displays the calling name corresponding to the calling number in the phonebook of the called MS. If the phonebook of the called MS does not store the calling user information corresponding to the calling number, the called MS only displays the calling number. Moreover, the called party is even unable to see the calling number if the called party has not subscribed to the CLIP service. In contrast to the CLIP service, the CNAP service is set by the calling party. When the calling party dials a called number, the service system sends the calling information to the called MS to facilitate the called party in identifying the calling party.

The prior call process of the CNAP service is briefly described below, and includes the following steps.

(1) A calling MS sends a call request to a switching system.

(2) The switching system determines that the call needs to trigger the CNAP service, and sends a calling information request to a calling information server. At the same time or after receiving a response returned by the calling information server, the switching system connects the call to the called MS.

(3) The calling information server stores the calling information set by the calling party. According to the calling information request sent by the switching system, the calling information server sends the calling information through a flash message to the called MS for displaying.

In researching the prior art and the practice process, the inventor of the present invention discovers that the sending of the calling information is independent of the connecting of the called MS after the CNAP service is triggered by the call in the foregoing call process. This makes it difficult to ensure that the calling information to be sent to the called MS at a proper time, and cannot help the called party to identify the calling party in some cases. For example, if the calling information is sent to the called MS before the called MS rings, while the called party is answering another call at the moment or another incoming call is received, misunderstanding may be caused to the called party; or, if the calling information is sent to the called MS after the conversation between the calling party and the called party already begins or finishes, the CNAP service is then insignificant with respect to helping the called party to know the calling information beforehand.

SUMMARY OF THE INVENTION

An embodiment of the present invention provides a method for sending the calling information to the called MS at a proper time to implement the CNAP service, and provides a calling information service apparatus.

A method for implementing the CNAP service includes:

receiving a service request sent by a switching system, where the service request carries the identifier of a calling party and the identifier of a called party;

querying calling information set by the calling party according to the identifier of the calling party, querying location information of the called party according to the identifier of the called party; and sending, after determining that the called MS already rings, a flash message that contains the calling information to the called MS according to the location information of the called party.

A calling information service apparatus includes:

a location querying unit, adapted to query location information of a called party according to the identifier of the called party; and a service processing unit, adapted to receive a service request sent by a switching system, where the service request carries an identifier of a calling party and the identifier of the called party, query calling information set by the calling party according to the identifier of the calling party, and send, after determining that the called MS already rings, a flash message that contains the calling information to the called MS according to the location information of the called party queried by the location querying unit.

In an embodiment of the present invention, a flash message that carries the calling information is sent to the called MS after it is determined that the called MS already rings. The present invention correlates judging the status of the call connection process with the time of implementing the CNAP service. Therefore, the calling information can be sent to the called MS at a proper time, thus helping the called party to identify the calling party correctly.

DETAILED DESCRIPTION OF THE EMBODIMENTS

Figure 1:
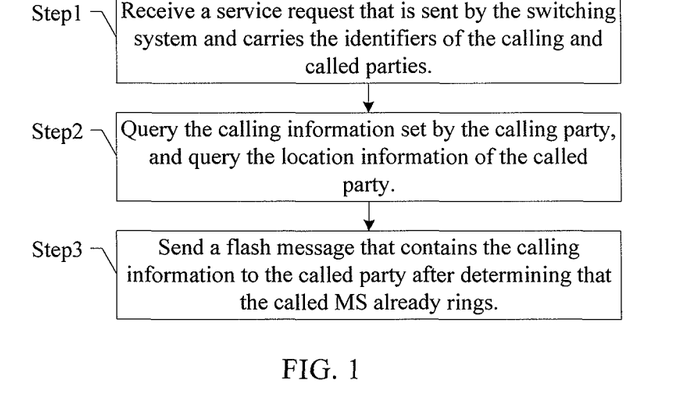
FIG. 1 shows the procedure of a method for implementing the CNAP service according to an embodiment of the present invention.

As shown in FIG. 1, the procedure of a method for implementing the CNAP service in an embodiment of the present invention includes the following steps.

Step 1: A service request sent by the switching system is received, where the service request carries an identifier of the calling party and an identifier of the called party.

The switching system refers to a network system that provides communication services for the calling party and the called party, including the switching equipment in an originating office and a terminating office, for example, a mobile service switching center (MSC), a service switching point (SSP), and the equipment that provides relevant data services such as a visitor location register (VLR) and a home location register (HLR).

The service request is a request triggered according to the service subscription information of a party in the call process. The service request may be a request for the CNAP service or a request for another service. If the service request is a request for another service, the "another service" is correlated with the CNAP service, and the CNAP service can be triggered through the request for this service.

Step 2: The calling information set by the calling party is queried according to the identifier of the calling party, and location information of the called party is queried according to the identifier of the called party.

The two querying operations in Step 2 are used to obtain the data required for sending the calling information. The two operations may be implemented at any time after the identifier of the calling party and the identifier of the called party are obtained and before the calling information is sent. Compared with the restrictions in Step 3, the two operations may be implemented before or after the called MS rings. Moreover, the operation of querying the location information of the called party may be an exclusive operation of the CNAP service process or an operation in the process of implementing another service as long as the query result can be used at the time of sending the calling information.

Step 3: After it is determined that the called MS rings, a flash message that carries the calling information is sent to the called MS according to the location information of the called party.

The time of sending the calling information is based on the judging of the current status of the call connection process. The judging mode may be different according to the actual system and the characteristics of the call process, including but not limited to:

(1) properly estimating the status of implementing the call connection process based on the time of implementation, for example, adapting the method of controlling the time through a timer;

(2) monitoring the status of implementing the call connection process proactively, for example, adapting the method of configuring reporting of a basic call state machine (BCSM) event according to the capabilities of the switching system;

(3) judging the status of implementing the call connection process according to a message indicative of the current call connection status in the call connection process. This mode requires a calling information service apparatus to participate in the call connection process directly; and (4) performing passive triggering through a message that implies the current call connection status in the prior process, for example, correlating the CNAP service with other existing services that are generally implemented after the called MS rings. The triggering of these services is regarded as a confirmation of the ringing of the called MS, and there is no need to judge the call connection status proactively. The CNAP service is implemented according to the service correlation directly.

Figure 2:
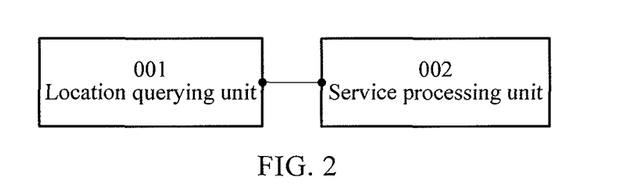
FIG. 2 shows the basic logical structure of a calling information service apparatus according to an embodiment of the present invention.

As shown in FIG. 2, a calling information service apparatus for implementing the foregoing method in an embodiment of the present invention includes:

a location querying unit 001, adapted to query the location information of the called party according to the identifier of the called party; and a service processing unit 002, adapted to receive a service request sent by the switching system, where the service request carries the identifier of the calling party and the identifier of the called party, query the calling information set by the calling party according to the identifier of the calling party, and send a flash message that carries the calling information to the called party according to the location information of the called party queried by the location querying unit 001 after determining that the called MS already rings.

Based on the specific service implementation process, the foregoing calling information service apparatus may be realized through modification of a service control point (SCP) on the intelligent network, combination of an SCP and an intelligent peripheral (IP), or modification of the equipment for operating other services.

The foregoing method and apparatus are described below in detail with reference to specific embodiments.

Figure 3:
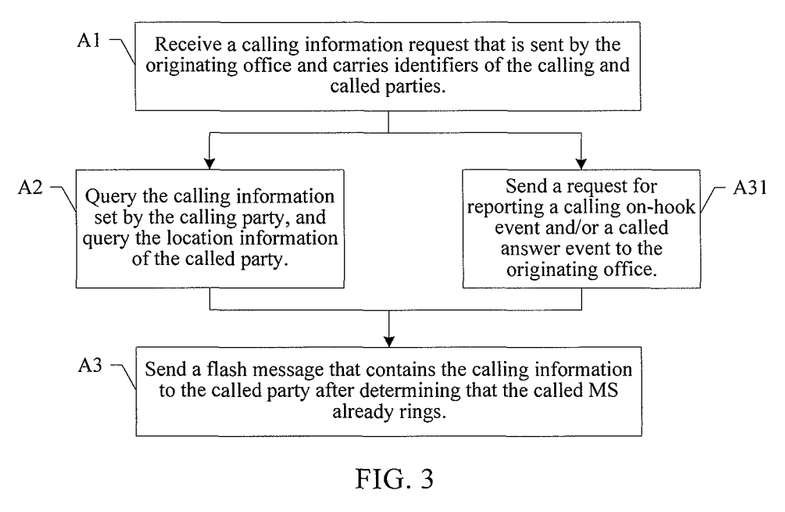
FIG. 3 shows the process of a method for implementing the CNAP service according to a first embodiment of the present invention.

As shown in FIG. 3, a method for implementing the CNAP service in the first embodiment of the present invention includes the following steps.

A1. A calling information request sent by the originating office, according to the subscription information of the calling party, is received, where the calling information request carries the identifier of the calling party and the identifier of the called party.

In this embodiment, the calling information request is a request for the CNAP service, and is originated by the originating office of the switching system. The mode of originating this calling information request is similar to that of originating a request for the Customized Applications for Mobile Network Enhanced Logic (CAMEL) service, that is, after the CNAP service is triggered by a call, the originating office learns that the calling party has subscribed to the CNAP service according to the subscription information (Originating CAMEL Subscription Information, O-CSI) of the calling party provided by the HLR, and thus triggers the calling information request.

A2. The calling information set by the calling party is queried according to the identifier of the calling party, and the location information of the called party is queried according to the identifier of the called party.

The calling information set by the calling party can be obtained through querying the saved service database.

The location information of the called party can be queried by means of sending a Send Routing Information for Short Message (SRI_for_SM) request to the HLR of the called party.

A3. After it is determined that the called MS rings, a flash message that carries the calling information is sent to the called MS according to the location information of the called party.

Based on the capabilities of the originating office, the following two judging modes can apply.

(1) If the originating office does not support reporting of a ringing event (for example, the originating office supports only CAMEL 1-3), it is appropriate to set a delay time after the calling information request is received from the originating office, and determine that the called MS already rings when the delay timer times out. The value of the delay time "n" is determined according to the conditions of the application network, and the recommended values are 3-10 seconds.

(2) If the originating office supports reporting of a ringing event (for example, supports CAMEL 4), a request for reporting the ringing event of the called party may be sent to the originating office after the calling information request is received from the originating office; after the called ringing event is received from the originating office, it is determined that the called MS already rings.

To further ensure effective implementation of the service, a condition for judging service termination may be set besides the foregoing judging conditions. Therefore, the implementation of the CNAP service may stop in some cases to avoid waste of network resources, for example, in the following cases.

A31. After the calling information request is received from the originating office, a request for reporting an on-hook event of the calling party and/or an answer event of the called party is sent to the originating office.

If the ringing of the called MS is also confirmed through event reporting, the request in this step may be sent together with the request for reporting a ringing event of the called party.

In this case, determining that the called MS already rings also include: The processing of the calling information service is terminated, after an on-hook event of the calling party or an answer event of the called party is received from the originating office.

If the ringing of the called MS is determined through a delay timer, the judging of service termination may be combined with the time judging, namely, judging whether an on-hook event of the calling party or an answer event of the called party is received from the originating office before the delay timer times out: if an on-hook event of the calling party or an answer event of the called party is received from the originating office before the delay timer times out, processing of the calling information service is terminated; or, if an on-hook event of the calling party or an answer event of the called party is not received from the originating office before the delay timer times out, it is determined that the called MS already rings when the delay timer times out.

Figure 4:
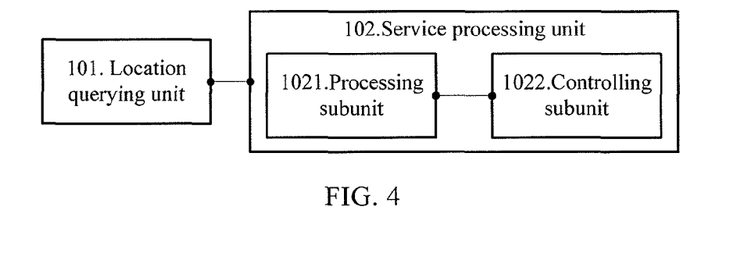
FIG. 4 shows the logical structure of a calling information service apparatus corresponding to the method according to the first embodiment of the present invention.

As shown in FIG. 4, a calling information service apparatus for implementing the method in an embodiment of the present invention includes:

a location querying unit 101, adapted to query the location information of the called party according to the identifier of the called party; and a service processing unit 102, which further includes a processing subunit 1021 and a controlling subunit 1022.

The processing subunit 1021 is adapted to receive a calling information request from the originating office according to the subscription information of the calling party, where the calling information request carries the identifier of the calling party and the identifier of the called party, query the calling information set by the calling party according to the identifier of the calling party, and send, as instructed by the controlling subunit 1022, a flash message that carries the calling information to the called party according to the location information of the called party found by the location querying unit 101.

If the ringing of the called MS is confirmed through event reporting, the processing subunit 1021 is further adapted to send a request for reporting a ringing event of the called party to the originating office after receiving the calling information request from the originating office.

Moreover, to further provide the capabilities of judging termination of the CNAP service, the processing subunit 1021 is further adapted to send a request, for reporting an on-hook event of the calling party and/or an answer event of the called party, to the originating office after receiving the calling information request from the originating office.

The controlling subunit 1022 is adapted to judge ringing of the called MS after the processing subunit 1021 receives the calling information request. The controlling subunit 1022 may provides either of the following functions:

(1) in the case of setting a delay time, instructs the processing subunit 1021 to send a flash message that carries the calling information when the delay timer times out, and further judges whether an on-hook event of the calling party or an answer event of the called party is received from the originating office before the delay timer times out, and, if an on-hook event of the calling party or an answer event of the called party is received from the originating office before the delay timer times out, terminates the processing of the calling information service; and (2) instructs the processing subunit 1021 to send a flash message that carries the calling information after receiving a ringing event of the called party from the originating office, and further terminates processing of the calling information service after receiving an on-hook event of the calling party or an answer event of the called party from the originating office.

The calling information service apparatus in this embodiment of the present invention may be realized through an SCP. In this case, the CNAP service may be triggered to the SCP by the originating office through an Initial Detect Point (IDP) message according to the O-CSI; the requirements for reporting various events may be configured to the originating office by the SCP through a Request Report BCSM Event (RRBE) request; and the location information of the called party may be obtained after the SCP sends an SRI_for_SM to the HLR of the called party.

The technical scheme of this embodiment ensures that the calling information is sent to the called MS after the called MS rings and before the called party answers the call (and/or before the calling party hangs up). Therefore, the called party can accurately know the relation between the currently ringing call and the received calling information, and know the calling information beforehand conveniently.

Figure 5:
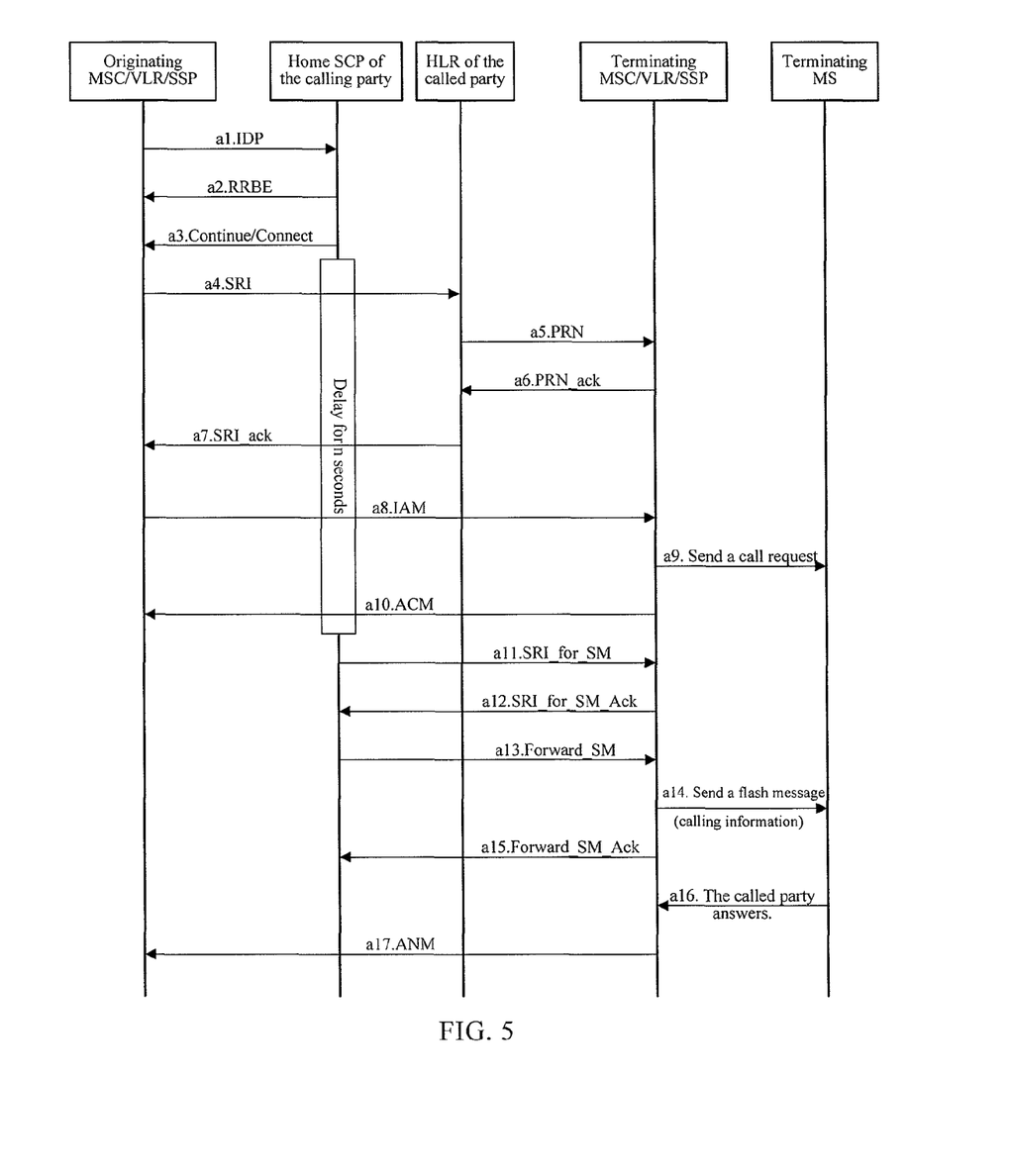
FIG. 5 shows a specific signaling flow of the first embodiment of the present invention.

For a better understanding of the foregoing embodiment, an example is given below to illustrate the technical scheme of this embodiment applied in a specific call process. In this example, the SCP works as a calling information service apparatus, the originating office (MSC/VLR/SSP) supports CAMEL 2, and the SCP judges the ringing of the called MS through a delay time. As shown in FIG. 5, the call process of the CNAP service includes the following steps:

a1. The originating MSC/VLR/SSP receives a call request from a CNAP service subscriber, triggers the service according to the O-CSI of the calling party, and sends an IDP message to the home SCP of the calling party.

a2. The home SCP of the calling party searches out the calling information set by the calling party, and sends an RRBE message to the originating MSC/VLR/SSP to configure an on-hook event of the calling party and an answer event of the called party.

a3. The home SCP of the calling party sends a Continue message or a Connect message to the originating MSC/VLR/SSP to instruct continuity of the call, and sets the delay time to n seconds; during the n seconds, if the originating office reports an on-hook event of the calling party or an answer event of the called party, the SCP terminates processing of the calling information service.

a4. The originating MSC/VLR/SSP sends a Send Routing Information (SRI) request to the HLR of the called party to query the mobile station roaming number (MSRN) of the called party.

a5. The HLR of the called party sends a Provide Roaming Number (PRN) request to the terminating MSC/VLR/SSP to query the MSRN of the called party.

a6. The terminating MSC/VLR/SSP returns a PRN_ack message, carrying the MSRN of the called party, to the HLR of the called party.

A7. The HLR of the called party returns an SRN_ack message, carrying the MSRN of the called party, to the originating MSC/VLR/SSP.

a8. The originating MSC/VLR/SSP sends an Initial Address Message (IAM) to the terminating MSC/VLR/SSP according to the MSRN of the called party, and connects the call to the terminating MSC/VLR/SSP.

a9. The terminating MSC/VLR/SSP sends a call request to the called MS, and the called MS begins ringing.

a10. The terminating MSC/VLR/SSP sends an Address Complete Message (ACM) to the originating MSC/VLR/SSP.

a11. When the delay timer times out, the home SCP of the calling party sends an SRI_for_SM message to the HLR of the called party.

a12. The HLR of the called party returns an SRI_for_SM_Ack to the home SCP of the calling party in response to the SRI_for_SM message, where the SRI_for_SM_Ack message carries the location information of the called party, the MSC address of the called party and the international mobile subscriber identity (IMSI) of the called party.

a13. The home SCP of the calling party sends a flash message "Forward_SM", carrying the calling information, to the terminating MSC.

a14. The terminating MSC sends the flash message that carries the calling information to the called MS, and the called MS displays the calling information and continues playing the ring tone.

a15. The terminating MSC returns a Forward_SM_Ack message to the home SCP of the calling party in response to the Forward_SM message.

a16. The called party hears the ring tone, sees the calling information, answers the incoming call, and returns a reply to the terminating MSC.

a17. The terminating MSC returns an ANswer Message (ANM) to the originating MSC, and a conversation between the calling party and the called party begins.

Figure 6:
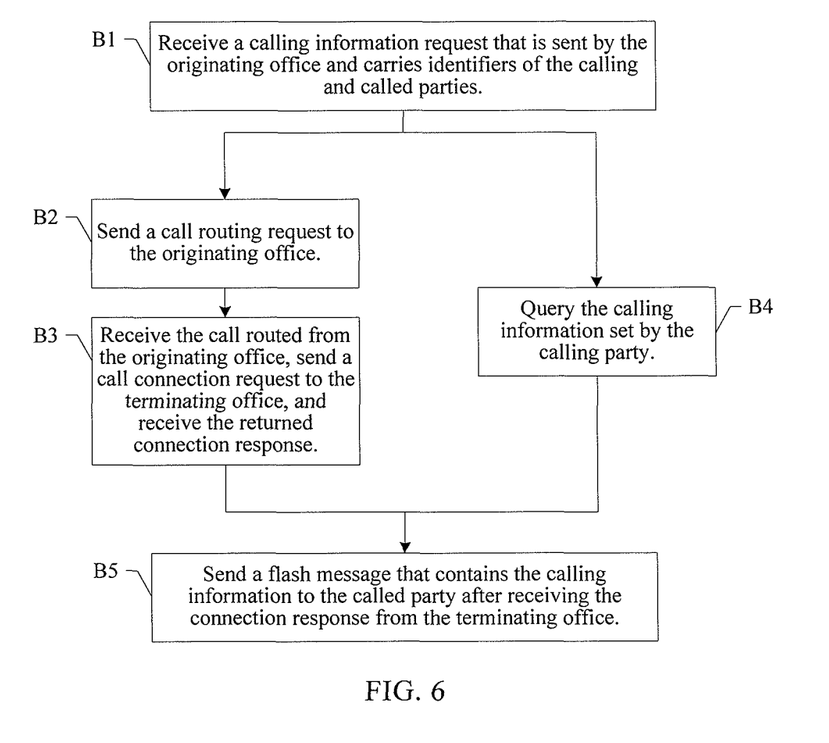
FIG. 6 shows the process of a method for implementing the CNAP service according to a second embodiment of the present invention.

The second embodiment of the present invention provides a method for implementing the CNAP service. The second embodiment differs from the first embodiment in that the calling information service apparatus participates in the call connection process directly, and judges whether the called MS rings according to a message indicative of the current call connection status in the call connection process. As shown in FIG. 6, the implementation process includes the following steps:

B1. A calling information request sent by the originating office according to the subscription information of the calling party is received, where the calling information request carries the identifier of the calling party and the identifier of the called party.

For this step, reference can be made to step A1 of the first embodiment.

B2. A call routing request is sent to the originating office after the calling information request is received from the originating office.

In this step, the calling information service apparatus notifies the originating office to route the call to the calling information service apparatus itself, and implements the subsequent call connection. If the calling information service apparatus is realized based on the SCP, a specific access code may precede the called number in the Connect message sent by the SCP to the originating office. This enables the originating office to route the call to the calling information service apparatus according to the access code.

B3. The call routed from the originating office according to the call routing request is received, a call connection request is sent to the terminating office, and a connection response from the terminating office is received.

For this step, reference can be made to the general call connection process. In the call connection process, it is necessary to query the HLR of the called party to obtain the relevant address of the called party. The response returned by the HLR of the called party generally includes the required IMSI and the terminating MSC address (VMSC-Address) parameter in addition to the MSRN. Therefore, the address information obtained in this process may be used for subsequent sending of the flash message that carries the calling information. It is also appropriate that a special request process is implemented to query the location information of the called party.

B4. The calling information set by the calling party is queried according to the identifier of the calling party.

This step is implemented at any time before a flash message is sent and after a calling information request is received.

B5. After a connection response is received from the terminating office, it is determined that the called MS already rings. A flash message that carries the calling information is sent to the called MS according to the location information of the called party.

While implementing the call connection, the calling information service apparatus may also play a ringback tone (RBT) to the calling party according to the general connection process after receiving a connection response from the terminating office. If the called party has set a ringback tone, the calling information service apparatus connects to the RBT platform to play a ringback tone to the calling party.

Because the calling information service apparatus in this embodiment of the present invention participates in the call connection process directly, it is not necessary to check the current call connection status by requesting the originating office to report a BCSM event. Therefore, the calling information service apparatus may terminate the conversation with the originating office after sending a call routing request to the originating office. It is also appropriate that the calling information service apparatus still requires the originating office to report a BCSM event. The relevant processes are similar to those in the first embodiment of the present invention, and thus are not repeatedly described here.

Figure 7:
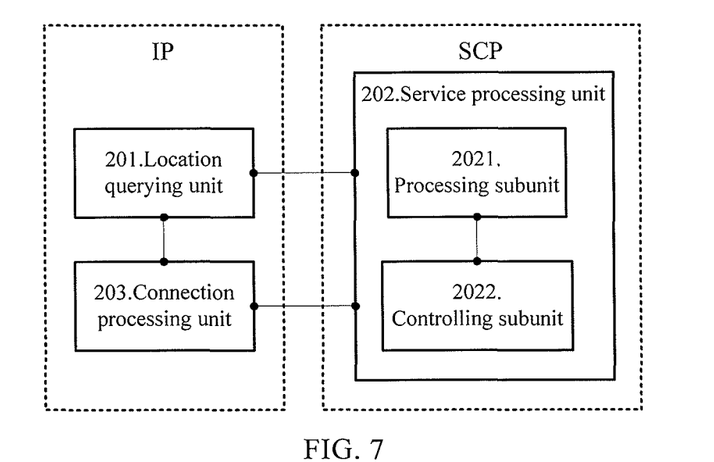
FIG. 7 shows the logical structure of a calling information service apparatus corresponding to the method according to the second embodiment of the present invention.

As shown in FIG. 7, a calling information service apparatus for implementing the method in an embodiment of the present invention includes:

a location querying unit 201, adapted to query the location information of the called party according to the identifier of the called party;

a connection processing unit 203, adapted to receive a call routed from the originating office according to a call routing request, send a call connection request to the terminating office, and receive a connection response from the terminating office; and a service processing unit 202, which further includes a processing subunit 2021 and a controlling subunit 2022.

The processing subunit 2021 is adapted to receive a calling information request from the originating office according to the subscription information of the calling party, where the calling information request carries the identifier of the calling party and the identifier of the called party, send a call routing request to the originating office after receiving the calling information request from the originating office, query the calling information set by the calling party according to the identifier of the calling party, and send, as instructed by the controlling subunit 2022, a flash message that carries the calling information to the called party according to the location information of the called party found by the location querying unit 201.

Moreover, to further provide the capabilities of judging termination of the CNAP service, the processing subunit 2021 is further adapted to send a request for reporting an on-hook event of the calling party and/or an answer event of the called party to the originating office after receiving a calling information request from the originating office.

The controlling subunit 2022 is adapted to instruct the processing subunit 2021 to send a flash message that carries the calling information after determining that the connection processing unit 203 receives a connection response from the terminating office, and further adapted to terminate processing of the calling information service after receiving an on-hook event of the calling party or an answer event of the called party from the originating office.

The calling information service apparatus in this embodiment of the present invention may be realized by the combination of an SCP and an IP connected through an interface, where the IP provides the call connection function. In this case, the service processing unit 202 is set on the SCP while the location querying unit 201 and the connection processing unit 203 are set on the IP. The location querying unit 201 that provides the location information of the called party to facilitate sending of a flash message may be a logical unit that provides the function of querying the called party address for the connection processing unit 203 in the call connection process. In this case, the connection processing unit 203 sends a call connection request to the terminating office according to the location information of the called party found by the location querying unit 201.

The technical scheme of this embodiment ensures that the calling information is sent to the called MS after the called MS rings and before the called party answers the call (and/or before the calling party hangs up). Therefore, the called party can accurately know the relation between the currently ringing call and the received calling information, and know the calling information beforehand conveniently.

Figure 8:
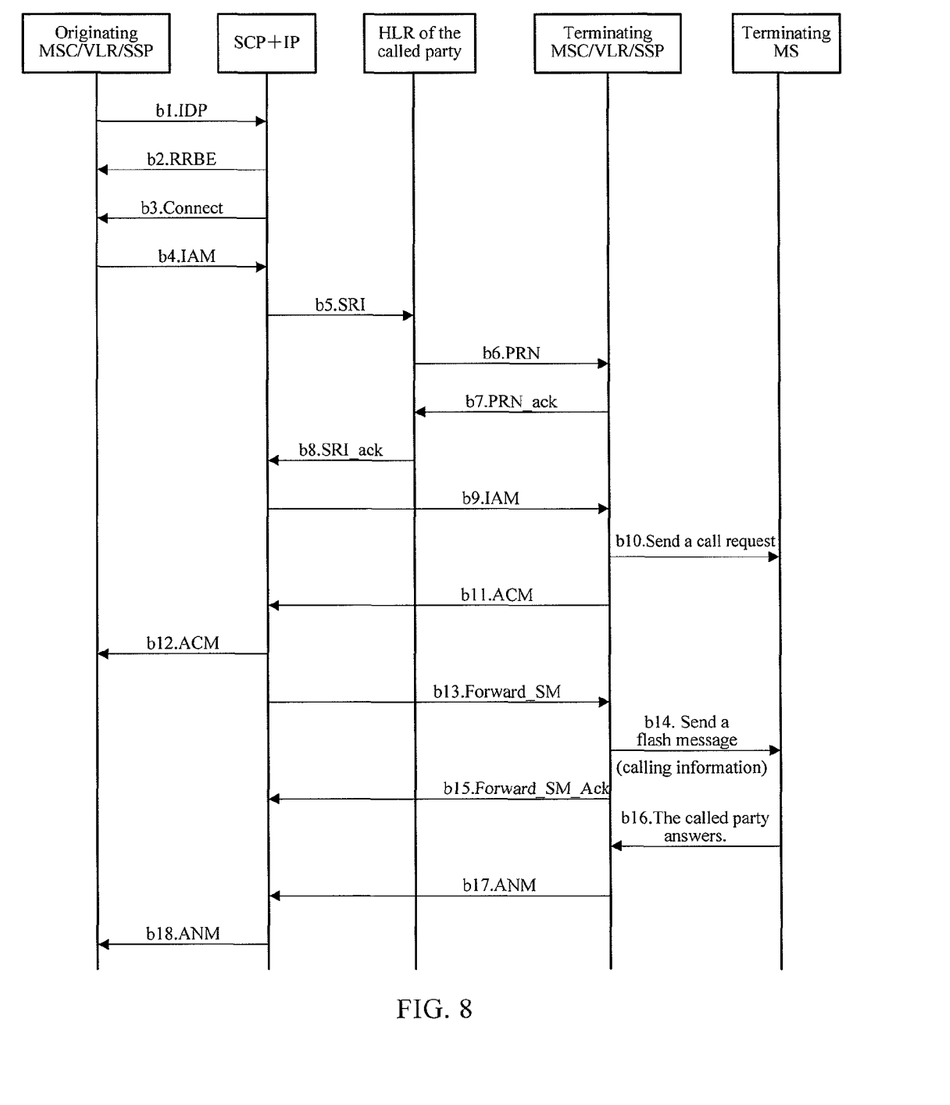
FIG. 8 shows a specific signaling flow of the second embodiment of the present invention.

For better understanding of the foregoing embodiment, an example is given below to illustrate the technical scheme of this embodiment applied in a specific call process. In this example, the calling information service apparatus is the combination of an SCP and an IP. As shown in FIG. 8, the call process of the CNAP service includes the following steps:

b1. The originating MSC/VLR/SSP receives a call request from a CNAP service subscriber, triggers the service according to the O-CSI of the calling party, and sends an IDP message to the home SCP of the calling party.

b2. The home SCP of the calling party searches out the calling information set by the calling party, and sends an RRBE message to the originating MSC/VLR/SSP to configure an on-hook event of the calling party and an answer event of the called party (this step is optional).

b3. The home SCP of the calling party sends a Connect message with a specific route code preceding the called number to the originating MSC/VLR/SSP, to instruct the originating MSC to route the call to the IP.

b4. The originating MSC routes the call to the IP in the calling information service apparatus according to the route code that precedes the called number.

b5-b8: Reference can be made to a4-a7. The IP in the calling information service apparatus obtains the MSRN of the called party, the IMSI and the VMSC-Address.

b9. The calling information service apparatus sends an IAM to the terminating MSC/VLR/SSP according to the MSRN of the called party, and connects the call to the terminating MSC/VLR/SSP.

b10. The terminating MSC/VLR/SSP sends a call request to the called MS, and the called MS begins ringing.

b11. The terminating MSC/VLR/SSP sends an ACM message to the calling information service apparatus.

b12. The IP in the calling information service apparatus sends an ACM message to the originating MSC, and plays a ringback tone to the calling party.

b13. The SCP in the calling information service apparatus sends a flash message "Forward_SM", carrying the calling information, to the terminating MSC; the IMSI and the VMSC-Address used for sending the flash message may be obtained from the SRI_ack received in step b8, and sent to the SCP through the interface between the IP and the SCP.

b14. The terminating MSC sends the flash message that carries the calling information to the called MS, and the called MS displays the calling information and continues playing the ring tone.

b15. The terminating MSC returns a Forward_SM_Ack to the SCP in the calling information service apparatus in response to the Forward_SM.

b16. The called party hears the ring tone, sees the calling information, answers the incoming call, and returns a reply to the terminating MSC.

b17. The terminating MSC returns an ANM to the IP in the calling information service apparatus.

b18. The IP in the calling information service apparatus returns an ANM to the originating MSC, and a conversation between the calling party and the called party begins.

Figure 9:
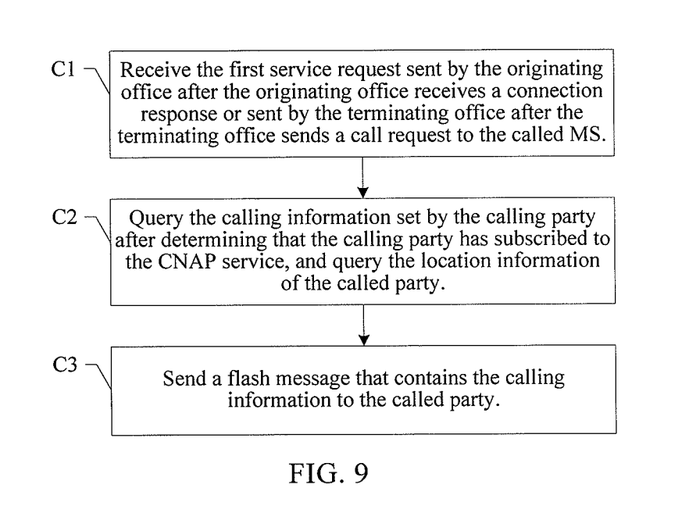
FIG. 9 shows the process of a method for implementing the CNAP service according to a third embodiment of the present invention.

The third embodiment of the present invention provides a method for implementing the CNAP service. The third embodiment differs from the first embodiment and the second embodiment of the present invention in that: The CNAP service in the third embodiment of the present invention is correlated with a first service, and, according to the characteristics of the time of triggering the first service, the triggering of the first service is regarded as a confirmation of the ringing of the called MS. As shown in FIG. 9, the implementation process includes the following steps.

C1. The first service request, sent by the originating office according to the service subscription information of the calling party or the called party after the originating office receives a connection response from the terminating office, is received; or the first service request, sent by the terminating office according to the service subscription of the calling party or the called party after the terminating office sends a call request to the called MS, is received; where the first service request carries the identifier of the calling party and the identifier of the called party.

The first service request is a request for the first service to be triggered at a specific time. The first service may be triggered by the originating office after the originating office receives a connection response from the terminating office, or triggered by the terminating office after the terminating office sends a call request to the called MS.

In this embodiment of the present invention, the RBT service is selected as the first service, and accordingly, the first service request is an RBT service request. In this embodiment of the present invention, the RBT service may be calling RBT or called RBT, depending on the modes of subscription to the RBT service, and may be triggered by the originating office or the terminating office. The specific service implementation mode of the RBT service may be selected from multitudinous existing practicable solutions as required, and is not limited in this embodiment of the present invention. For example, the RBT service mode triggered by the originating office may apply. That is, the originating office, after receiving a connection response from the terminating office, triggers an RBT service request according to the called service code (RBT SS_CODE) obtained from the HLR of the called party.

C2. The calling information set by the calling party is queried, after it is determined, according to the identifier of the calling party carried in the first service request, that the calling party has subscribed to the CNAP service; and the location information of the called party is queried according to the identifier of the called party.

In this embodiment of the present invention, the CNAP service is correlated with the RBT service, and the CNAP service may be triggered indirectly through an RBT service request. Evidently, not all calling parties of the calls that trigger the RBT service have subscribed to the CNAP service. Therefore, it is necessary to make sure that the calling party has subscribed to the CNAP service before querying the calling information.

Based on the correlation between the RBT service and the CNAP service, the RBT service may be regarded as a basic service and the CNAP service may be regarded as an additional service. In the call process, the service can be implemented if one party has subscribed to the basic service and this party or the other party has subscribed to the additional service. If the calling RBT service that the calling party subscribes to is used as a basic service, the calling party needs to subscribe to both the calling RBT service and the CNAP service to implement the function of calling name presentation. In this case, the calling information and the RBT information of the calling party are on the same platform. If the called RBT service that the called party subscribes to is used as a basic service, and the calling party has subscribed to the CNAP service, the called party needs to subscribe to the called RBT service to implement the function of receiving the calling information. In this case, the calling information of the calling party and the RBT information of the called party are on the same platform.

C3. A flash message that carries the calling information is sent to the called party according to the location information of the called party.

Based on the characteristics of the time of triggering the RBT service, this embodiment of the present invention determines that the called MS already rings when an RBT service request is received from the originating office or terminating office. Therefore, the CNAP service may be implemented directly according to the service correlation.

Figure 10:
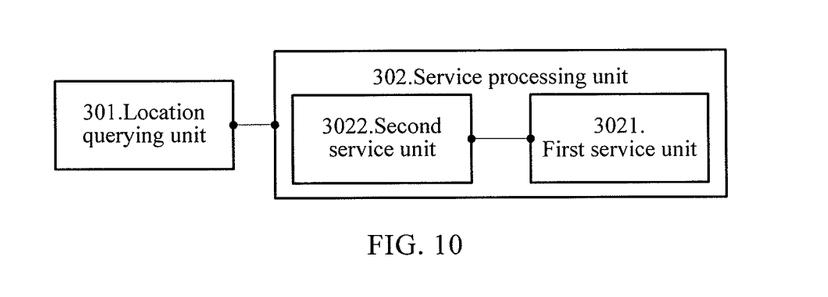
FIG. 10 shows the logical structure of a calling information service apparatus corresponding to the method according to the third embodiment of the present invention.

As shown in FIG. 10, a calling information service apparatus for implementing the method in an embodiment of the present invention includes:

a location querying unit 301, adapted to query the location information of the called party according to the identifier of the called party; and a service processing unit 302, which further includes a first service unit 3021 and a second service unit 3022.

The first service unit 3021 is adapted to receive the first service request sent by the originating office according to the service subscription information of the called party or the called party after the originating office receives a connection response from the terminating office, or receive the first service request sent by the terminating office according to the service subscription information of the calling party or the called party after the terminating office sends a call request to the called MS, where the first service request carries the identifier of the calling party and the identifier of the called party;

The second service unit 3022 is adapted to query the calling information set by the calling party according to the identifier of the calling party after determining that the calling party has subscribed to the CNAP service according to the identifier of the calling party in the first service request obtained by the first service unit 3021, and send a flash message that carries the calling information to the called party according to the location information of the called party found by the location querying unit 301 after querying and obtaining the calling information set by the calling party.

The calling information service apparatus in this embodiment of the present invention may be realized through an apparatus that can provide RBT services, for example, an RBT platform. It is enough to add the functions of the CNAP service to an existing RBT platform, and both services are triggered by the mechanism of triggering the RBT service. In this case, the first service unit is the functional unit that handles the RBT service, and the second service unit is the functional unit that handles the CNAP service triggered synchronously.

This embodiment of the present invention ensures that the calling information is sent to the called MS after the called MS rings, and enables the called party to accurately know the relation between the currently ringing call and the received calling information. Furthermore, the service can be implemented conveniently by adding relevant functions based on the existing RBT platform.

Figure 11:
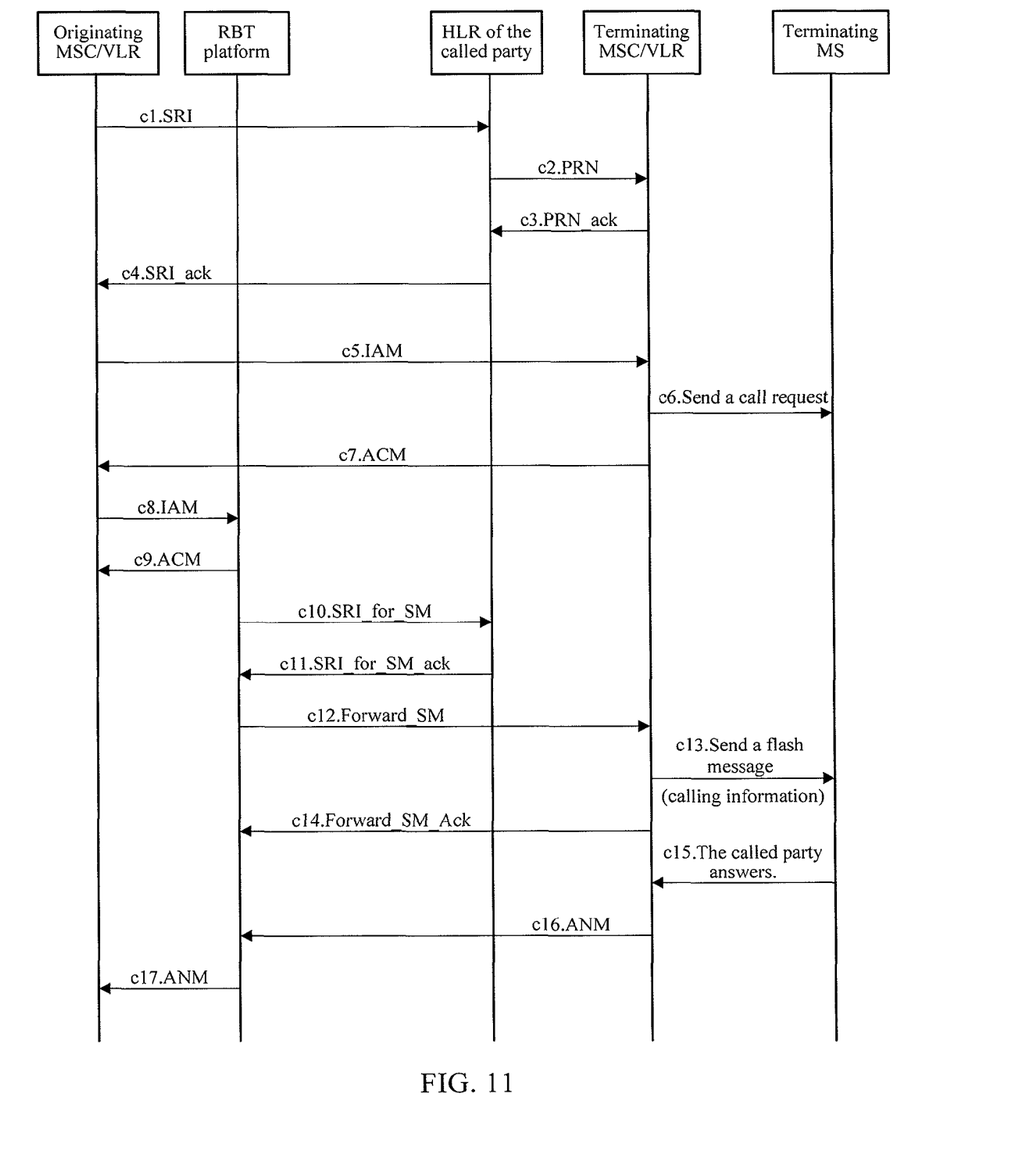
FIG. 11 shows a specific signaling flow of the third embodiment of the present invention.

For better understanding of the foregoing embodiment, an example is given below to illustrate the technical scheme of this embodiment of the present invention applied in a specific call process. In this example, the RBT platform with functions of the CNAP service is used as a calling information service apparatus, and the called RBT service mode triggered by the originating office is applied. As shown in FIG. 11, the call process of the CNAP service includes the following steps.

c1-c4. Reference can be made to a4-a7. The originating MSC receives a call request from a CNAP service subscriber, sends an SRI to the HLR of the called party, and obtains the MSRN and the RBT service code "SS_CODE" of the called party.

c5. The originating MSC sends an IAM to the terminating MSC according to the MSRN of the called party, and connects the call to the terminating MSC.

c6. The terminating MSC sends a call request to the called MS, and the called MS begins ringing.

c7. The terminating MSC sends an ACM message to the originating MSC.

c8. The originating MSC suspends transitorily the voice connection with the called side, and sends an IAM to the RBT platform according to the SS_CODE of the called party.

c9. The RBT platform sends an ACM message to the originating MSC, sets up a voice connection with the calling party, and plays a ringback tone to the calling party.

c10-c11. Reference can be made to a11-a12. The RBT platform obtains the MSC address and the IMSI of the called party from the HLR of the called party.

c12. The RBT platform sends a flash message "Forward_SM", carrying the calling information, to the terminating MSC.

c13. The terminating MSC sends the flash message that carries the calling information to the called MS, and the called MS displays the calling information and continues playing the ring tone.

c14. The terminating MSC returns a Forward_SM_Ack to the RBT platform in response to the Forward_SM.

c15. The called party hears the ring tone, sees the calling information, answers the incoming call, and returns a reply to the terminating MSC.

c16. The terminating MSC returns an ANM to the RBT platform.

c17. The RBT platform returns an ANM to the originating MSC; the originating MSC releases the voice channel between the RBT platform and the calling party, and puts through the voice channel between the calling party and the called party, and a conversation between the calling party and the called party begins.

In one embodiment, computer readable media comprises computer program codes for implementing a calling name presentation, CNAP, service. The computer program codes may be logic encoded in one or more tangible media for execution. As used herein, logic encoded in one or more tangible media is defined as instructions that are executable by a programmed processor and that are provided on computer-readable storage media, memories, or a combination thereof. When executed, the logic is operable to receive a service request from a switching system, wherein the service request carries an identifier of a calling party and an identifier of a called party; obtain calling information set by the calling party according to the identifier of the calling party, and location information of the called party according to the identifier of the called party; and send a flash message that carries the calling information to a called terminal according to the location information of the called party when determining that the called terminal rings. When executed, the logic encoded in one or more tangible media is also operable to determine that the called terminal rings when a set delay timer times out or according to a ringing event of the called party received from the switching system. When executed, the logic encoded in one or more tangible media is also operable to send a request for reporting a ringing event of the called party to the switching system when the service request from the switching system is received. When executed, the logic encoded in one or more tangible media is also operable to send a call routing request to the switching system when the service request from the switching system is received; send a call connection request to a terminating office of the called terminal according to a received call routed from the switching system; receive a connection response from the terminating office; and determine that the called terminal rings according to the connection response from the terminating office.

Although the invention has been described through some exemplary embodiments, the present invention is not limited to such embodiments. It is apparent that those skilled in the art can make various modifications and variations to the invention without departing from the spirit and scope of the present invention. The invention is intended to cover the modifications and variations provided that they fall in the scope of protection defined by the following claims or their equivalents.

What is claimed is:

1. A method for implementing a calling name presentation (CNAP) service, comprising:
   receiving a service request from a switching system, wherein the service request carries an identifier of a calling party and an identifier of a called party;
   obtaining calling information set by the calling party according to the identifier of the calling party, and location information of the called party according to the identifier of the called party; and
   sending a flash message that carries the calling information to a called terminal according to the location information of the called party when determining that the called terminal rings,
   wherein the called terminal rings when a set delay timer times out; and
   the service request is sent via at least one of the following:
   the service request is sent by a originating office according to service subscription information of the calling party or the called party when the originating office receives a connection response from a terminating office; and
   the service request is sent by a terminating office according to service subscription information of the calling party or the called party when the originating office sends a call request to the called terminal.

2. The method according to claim 1, wherein the receiving a service request from a switching system comprises:
   receiving a calling information request sent, according to subscription information of the calling party, by an originating office.

3. The method according to claim 1, wherein the called terminal rings according to a ringing event of the called party received from the switching system.

4. The method according to claim 3, further comprising:
   sending a request for reporting the ringing event of the called party to the switching system when the service request from the switching system is received.

5. A non-transitory computer readable media, comprising logic encoded in the computer readable media, the logic when executed operable to implement the method according to the claim 3.

6. The method according to claim 1, further comprising:
   sending a call routing request to the switching system when the service request from the switching system is received;
   sending a call connection request to a terminating office of the called terminal according to a received call routed from the switching system;

receiving a connection response from the terminating office;

wherein the ringing of the called terminal is determined according to the connection response from the terminating office.

7. The method according to claim 6, further comprising:
determining whether to terminate the CNAP service according to set conditions for judging service termination, before sending the flash message that carries the calling information to the called terminal.

8. The method according to claim 1, wherein a first service corresponding to the received service request is correlated with the CNAP service, the CNAP service is triggered by the service request of the first service; wherein the called terminal rings according to the received service request of the first service.

9. The method according to claim 8, further comprising:
determining whether the calling party has subscribed to the CNAP service before obtaining the calling information.

10. The method according to claim 1, further comprising:
determining whether to terminate the CNAP service according to set conditions for judging service termination, before sending the flash message that carries the calling information to the called terminal.

11. The method according to claim 10, further comprising:
terminating the CNAP service when receiving an on-hook event of the calling party or an answer event of the called party from the switching system.

12. The method according to claim 11, further comprising:
sending a request for reporting an on-hook event of the calling party or an answer event of the called party to the switching system when receives the service request from the switching system.

13. A non-transitory computer readable media, comprising logic encoded in the computer readable media, the logic when executed operable to implement the method according to the claim 1.

14. A calling information service apparatus for implementing a calling name presentation (CNAP) service, comprising:
a service processing unit, adapted to receive a service request sent by a switching system, wherein the service request carries an identifier of a calling party and an identifier of a called party, obtain calling information set by the calling party according to the identifier of the calling party, and send a flash message that carries the calling information to a called terminal according to location information of the called party when determining that the called terminal rings; and
a location querying unit, adapted to obtain the location information of the called party according to the identifier of the called party,
wherein the called terminal rings when a set delay timer times out; and
the service processing unit further comprises a processing subunit and a controlling subunit;
the processing subunit is adapted to receive calling information request from a originating office according to subscription information of the calling party, obtain the calling information set by the calling arty according to the identifier of the calling party, and send the flash message that carries the calling information to the called party according to the location information of the called party when receives an instruction from the controlling subunit; and
the controlling subunit is adapted to judge whether the called terminal rings, and instruct the processing subunit to send the flash message when determining that the called terminal rings according to a set delay time.

15. The apparatus according to claim 14, wherein
the processing subunit is further adapted to send a request for reporting a ringing event of the called party to the originating office; and
the controlling subunit is further adapted to instruct the processing subunit to send the flash message when determining that the called terminal rings according to a received ringing event of the called party from the originating office.

16. The apparatus according to claim 15, wherein the processing subunit is further adapted to send a request for reporting an on-hook event of the calling party or an answer event of the called party to the originating office when receives the calling information request from the originating office; and
the controlling subunit is further adapted to terminate the processing of the calling information service when an on-hook event of the calling party or an answer event of the called party is received from the originating office.

17. The apparatus according to claim 14, wherein the processing subunit is further adapted to send a request for reporting an on-hook event of the calling party or an answer event of the called party to the originating office when receives the calling information request from the originating office; and
the controlling subunit is further adapted to terminate the processing of the calling information service when an on-hook event of the calling party or an answer event of the called party is received from the originating office.

18. The apparatus according to claim 14, wherein the apparatus further comprises:
a connection processing unit, adapted to receive a call routed from a originating office according to a call routing request, send a call connection request to a terminating office of the called terminal according to the received call routed, and receive a connection response from the terminating office;
wherein
the processing subunit is further adapted to send a call routing request to the originating office when receives the calling information request from the originating office; and
the controlling subunit is further adapted to instruct the processing subunit to send the flash message that carries the calling information when determining that the called terminal rings according to a received connection response by the connection processing unit from the terminating office.

19. The apparatus according to claim 18, wherein the service processing unit is set on a service control point (SCP), and the location querying unit and the connection processing unit are set on an intelligent peripheral (IP).

20. The apparatus according to claim 18, wherein the processing subunit is further adapted to send a request for reporting an on-hook event of the calling party or an answer event of the called party to the originating office when receives the calling information request from the originating office; and
the controlling subunit is further adapted to terminate the processing of the calling information service when an on-hook event of the calling party or an answer event of the called party is received from the originating office.

21. The apparatus according to claim 14, wherein the service processing unit further comprises:
a first service unit, adapted to receive the service request sent by the originating office according to service subscription information of the called party or the called party when the originating office receives a connection response from a terminating office, wherein a first service corresponding to the received service request is correlated with the CNAP service, and the CNAP service is triggered by the service request of the first service; and a second service unit, adapted to obtain the calling information set by the calling party according to the identifier of the calling party when determining that the calling party has subscribed to the CNAP service according to the identifier of the calling party in the service request obtained by the first service unit, and send the flash message that carries the calling information to the called party according to the location information of the called party found by the location querying unit.

22. The apparatus according to claim 14, wherein the service processing unit further comprises:

a first service unit, adapted to receive the service request sent by a terminating office according to service subscription information of the calling party or the called party when the terminating office sends a call request to the called terminal, wherein a first service corresponding to the received service request is correlated with the CNAP service, the CNAP service is triggered by the service request of the first service; and a second service unit, adapted to obtain the calling information set by the calling party according to the identifier of the calling party when determining that the calling party has subscribed to the CNAP service according to the identifier of the calling party in the service request obtained by the first service unit, and send the flash message that carries the calling information to the called party according to the location information of the called party found by the location querying unit.

\* \* \* \* \*

UNITED STATES PATENT AND TRADEMARK OFFICE
CERTIFICATE OF CORRECTION

PATENT NO. : 8,571,531 B2  
APPLICATION NO. : 12/271062  
DATED : October 29, 2013  
INVENTOR(S) : Wen Zhou Page 1 of 1

It is certified that error appears in the above-identified patent and that said Letters Patent is hereby corrected as shown below:

In the Claims

Claim 12, Column 15, Line 33 "when receives" should read -- when it receives --.

Claim 14, Column 15, Line 60 "calling arty" should read -- calling party --.

Claim 14, Column 15, Line 64 "when receives" should read -- when it receives --.

Claim 16, Column 16, Line 15 "when receives" should read -- when it receives --.

Claim 17, Column 16, Line 24 "when receives" should read -- when it receives --.

Claim 18, Column 16, Line 40 "when receives" should read -- when it receives --.

Claim 20, Column 16, Line 56 "when receives" should read -- when it receives --.

Signed and Sealed this  
Twenty-eighth Day of January, 2014

Michelle K. Lee  
*Deputy Director of the United States Patent and Trademark Office*